United States Patent
Zheng et al.

(10) Patent No.: US 10,088,615 B2
(45) Date of Patent: Oct. 2, 2018

(54) FLUOROPOLYMER-BASED POLYMER BLENDS, POLYMER FILMS, AND POLARIZER PROTECTIVE FILMS

(71) Applicant: Akron Polymer Systems, Inc., Akron, OH (US)

(72) Inventors: Xiaoliang Zheng, Hudson, OH (US); Frank W. Harris, Boca Raton, FL (US); Thauming Kuo, Kingsport, TN (US); Bin Wang, Kingsport, TN (US); Ted Germroth, Kingsport, TN (US); Dong Zhang, Uniontown, OH (US); Douglas S. McWilliams, Piney Flats, TN (US); Peiyao Wang, Akron, OH (US)

(73) Assignee: Akron Polymer Systems, Inc., Akron, OH (US)

( * ) Notice: Subject to any disclaimer, the term of this patent is extended or adjusted under 35 U.S.C. 154(b) by 310 days.

(21) Appl. No.: 15/004,484

(22) Filed: Jan. 22, 2016

(65) Prior Publication Data
US 2016/0215132 A1    Jul. 28, 2016

Related U.S. Application Data

(60) Provisional application No. 62/106,777, filed on Jan. 23, 2015.

(51) Int. Cl.
| | |
|---|---|
| C08L 27/12 | (2006.01) |
| G02B 1/14 | (2015.01) |
| G02B 27/26 | (2006.01) |
| G02B 5/30 | (2006.01) |
| C08L 33/12 | (2006.01) |
| G02F 1/13363 | (2006.01) |
| G02F 1/1335 | (2006.01) |
| G02B 1/04 | (2006.01) |
| C08L 25/18 | (2006.01) |
| C08F 12/20 | (2006.01) |

(52) U.S. Cl.
CPC ............ G02B 5/305 (2013.01); C08F 12/20 (2013.01); C08L 25/18 (2013.01); C08L 33/12 (2013.01); G02B 1/04 (2013.01); G02B 1/14 (2015.01); G02B 5/3083 (2013.01)

(58) Field of Classification Search
CPC .......... C08L 27/12; C08L 33/04–33/12; C08L 25/04–25/06; C08L 25/18; G02B 1/04; G02B 1/14; G02B 5/3083; G02B 5/305
See application file for complete search history.

(56) References Cited

U.S. PATENT DOCUMENTS

| | | | |
|---|---|---|---|
| 3,524,906 A * | 8/1970 | Miller, Jr. ............... | C08L 33/12 428/142 |
| 5,081,175 A | 1/1992 | Yagi et al. | |
| 8,871,882 B2 | 10/2014 | Zheng et al. | |
| 8,889,043 B2 | 11/2014 | Wang et al. | |
| 2005/0018095 A1* | 1/2005 | Kim ................... | G02B 27/2264 349/13 |
| 2006/0204675 A1 | 9/2006 | Gao et al. | |
| 2007/0134438 A1 | 6/2007 | Fabick et al. | |
| 2009/0202822 A1 | 8/2009 | Hasegawa et al. | |
| 2011/0076487 A1* | 3/2011 | Zheng ....................... | C08J 5/18 428/336 |
| 2014/0126055 A1 | 5/2014 | Wang et al. | |

FOREIGN PATENT DOCUMENTS

KR    10-2013-0079506 A    7/2013

OTHER PUBLICATIONS

Nishimura et al. "Viewing angle compensation of various LCD modes by using a liquid crystalline polymer film Nisseki LC film". Proceedings of SPIE: SPIE Optics + Photonics, (2006); pp. 633203-1 to 633203-8.*

Souzy, R., et al., "Synthesis and (co)polymerization of monofluoro, difluoro, trifluorostyrene and ((trifluorovinyl)oxy) benzene," Progress in Polymer Science, vol. 29, 2004, pp. 75-106, Elsevier Ltd., MO, USA.

* cited by examiner

*Primary Examiner* — Prashant J Khatri
(74) *Attorney, Agent, or Firm* — Calfee, Halter & Griswold LLP (57) ABSTRACT

A polymer blend includes a combination of an acrylic polymer and a styrenic fluoropolymer. The polymer blend may be used to make polymer films having a single glass transition temperature, a polarizing plate, or a display device with enhanced optical properties.

29 Claims, 5 Drawing Sheets

FLUOROPOLYMER-BASED POLYMER BLENDS, POLYMER FILMS, AND POLARIZER PROTECTIVE FILMS

RELATED APPLICATIONS

This application claims priority to U.S. Prov. Appln. No. 62/106,777, filed on Jan. 23, 2015, entitled "Fluoropolymer-Based Polymer Blends, Polymer Films, and Polarizer Protective Films.

FIELD OF THE INVENTION

This invention pertains to a polymer blend, a polymer film, and a polarizer protective film including a styrenic fluoropolymer and an acrylic polymer. More specifically, this invention relates to a polymer blend that exhibits the unique ability to form clear films upon mixing a styrenic fluropolymer with an acrylic polymer to be used as a protective film for polarizers in an optical device such as liquid crystal display, OLED display, 3D glasses, optical switch, or waveguide where a controlled light management is desirable.

BACKGROUND

Polystyrene is one of the most widely used plastics. Compared to aliphatic polymers, such as polyethylene and polypropylene, polystyrene is capable of providing unique mechanical and optical properties due to the presence of a hard, polarizable aromatic ring. However, polystyrene is inherently brittle, which has caused deficiencies in many of its applications. Thus, it would be beneficial to create a polymer that would overcome this shortcome.

Fluoropolymers are polymers having fluorine atoms attached to the backbone of the polymers. Common fluoropolymers are polytetrafluoroethylene (PTFE), ethylene-tetrafluoroethylene (ETFE) copolymers, tetrafluoroethylene (TFE) and hexafluoropropylene (HFP) copolymers, and poly(vinylidine fluoride) (PVDF).

Fluoropolymers are known to exhibit exceptional resistance to high temperature, chemicals, corrosion, and abrasion. They are capable of providing mechanical toughness, low friction, non-stick, and other properties desirable for high performance plastics, films, and coatings.

Unlike polystyrene, styrenic fluoropolymers, such as poly (α,β,β-trifluorostyrene), have been shown to have much improved mechanical properties and desirable optical properties to render them suitable for optical film applications. Unlike other common fluoropolymers, which are mostly crystalline and difficult to dissolve, styrenic fluoropolymers are amorphous and soluble. The good solubility exhibited by styrenic fluoropolymers may enable them to be used as a modifier for other polymers to improve their mechanical properties or obtain the desirable optical properties. In order to achieve this, the styrenic fluoropolymer must also have good compatibility with the polymer to be modified. However, it is commonly understood that styrenic fluopolymers do not have good compatibility with many target polymers, such as polyimides, and produce a heterogeneous, hazy solution when combined. Thus, it would be beneficial to provide a polymer blend containing a styrenic fluoropolymer that is capable of forming a homogeneous mixture suitable for use in applications that require high mechanical strength and optical clarity, such as optical devices and protective coatings.

SUMMARY

In one embodiment, this invention provides a polymer blend including:
i. a fluoropolymer having a moiety of wherein $R^1$, $R^2$, and $R^3$ are each independently hydrogen atoms, alkyl groups, substituted alkyl groups, or halogens, wherein at least one of $R^1$, $R^2$, and $R^3$ is a fluorine atom, wherein R is each independently a substituent on the styrenic ring, n is an integer from 0 to 5 representing the number of the substituents on the styrenic ring; and
ii. an acrylic polymer.

In another embodiment, this invention provides a polymer film which is made from a polymer blend including:
i. a fluoropolymer having a moiety of wherein $R^1$, $R^2$, and $R^3$ are each independently hydrogen atoms, alkyl groups, substituted alkyl groups, or halogens, wherein at least one of $R^1$, $R^2$, and $R^3$ is a fluorine atom, wherein R is each independently a substituent on the styrenic ring, n is an integer from 0 to 5 representing the number of the substituents on the styrenic ring; and
ii. an acrylic polymer.

In yet another embodiment, this invention provides a polarizing plate including:
(a) a polarizer; and
(b) a polarizer protective film, which is made from a polymer blend including:
i. a fluoropolymer having a moiety of wherein $R^1$, $R^2$, and $R^3$ are each independently hydrogen atoms, alkyl groups, substituted alkyl groups, or halogens, wherein at least one of $R^1$, $R^2$, and $R^3$ is a fluorine atom, wherein R is each independently a substituent on the styrenic ring, n is an integer from 0 to 5 representing the number of the substituents on the styrenic ring; and ii. an acrylic polymer.

DETAILED DESCRIPTION

The inventors have found that styrenic fluoropolymers have exceptionally poor compatibility with polymers such as polyimides, polyamides, polyesters, cellulose esters, and cyclic polyolefins (COP), presumably due to the lack of polar groups needed to interact with the functionalities in other polymers as well as the inability to form hydrogen bonds. Attempts to mix styrenic fluoropolymer solutions with other polymer solutions typically result in heterogeneous mixtures or hazy solutions; polymer films with good clarity thus cannot be prepared. However, it has been found blending certain acrylic polymers with styrenic fluoropolymers creates clear, homogeneous solutions, the resulting polymers of which can be cast into polymer films having high light transmittance, suitable for application in optical devices.

Thus, in one embodiment, there is provided a polymer blend including:

i. a fluoropolymer having a moiety of wherein $R^1$, $R^2$, and $R^3$ are each independently hydrogen atoms, alkyl groups, substituted alkyl groups, or halogens, wherein at least one of $R^1$, $R^2$, and $R^3$ is a fluorine atom, wherein R is independently a substituent on the styrenic ring, and n is an integer from 0 to 5 representing the number of R substituents on the styrenic ring; and ii. an acrylic polymer.

In one embodiment, at least two of $R^1$, $R^2$, and $R^3$ are fluorine atoms; in another embodiment, $R^1$, $R^2$, and $R^3$ are all fluorine atoms.

Examples of the substituent R on the styrenic ring may include alkyl, substituted alkyl, halogen, hydroxyl, carboxyl, nitro, alkoxy, amino, sulfonate, phosphate, acyl, acyloxy, phenyl, alkoxycarbonyl, cyano, and the like.

In another embodiment, the polymer blend has a single glass transition temperature (Tg), which is an indication that the components of the blend are compatible and will likely yield a homogeneous solution.

The polymer blend may include from about 1 to about 99, 5 to 95, 10 to 90, 15 to 85, 20 to 80, 25 to 75, 30 to 70, 35 to 65, or 40 to 60 percent of fluoropolymer (i) and from about 1 to about 99, 5 to 95, 10 to 90, 15 to 85, 20 to 80, 25 to 75, 30 to 70, 35 to 65, or 40 to 60 percent of the acrylic polymer (ii), based on the total weight of (i) and (ii). In one embodiment, the weight percent of the fluoropolymer (i) is from 10% to 30% and the weight percent of the acrylic polymer (ii) is from 70% to 90%, based on the total weight of (i) and (ii).

The fluoropolymer (i) of the present invention may be a homopolymer or a copolymer. The homopolymer may be prepared by polymerization of a fluorine-containing monomer having the structures below:

wherein $R^1$, $R^2$, and $R^3$ are each independently hydrogen atoms, alkyl groups, substituted alkyl groups, or halogens and wherein at least one of $R^1$, $R^2$, and $R^3$ is a fluorine atom. R is independently a substituent on the styrenic ring and n is an integer from 0 to 5 representing the number of R substituents on the styrenic ring.

Examples of such fluorine-containing monomers include, but not limited to, α,β,β-trifluorostyrene, α,β-difluorostyrene, β,β-difluorostyrene, α-fluorostyrene, and β-fluorostyrene. In one embodiment the homopolymer is poly(α,β,β-trifluorostyrene).

A fluoropolymer (i) copolymer may be prepared by the copolymerization of one or more of the fluorine-containing monomers with one or more ethylenically unsaturated monomers. Examples of ethylenically unsaturated monomers include, but not limited to, methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethylhexyl acrylate, isoprene, octyl acrylate, octyl methacrylate, iso-octyl acrylate, iso-octyl methacrylate, trimethylolpropyl triacrylate, styrene, α-methyl styrene, nitrostyrene, bromostyrene, iodostyrene, cyanostyrene, chlorostyrene, 4-t-butylstyrene, 4-methylstyrene, vinyl biphenyl, vinyl triphenyl, vinyl toluene, chloromethyl styrene, acrylic acid, methacrylic acid, itaconic acid, crotonic acid, maleic anhydride, tetrafluoroethylene (and other fluoroethylenes), glycidyl methacrylate, carbodiimide methacrylate, $C_1$-$C_{18}$ alkyl crotonates, di-n-butyl maleate, di-octylmaleate, allyl methacrylate, di-allyl maleate, di-allylmalonate, methyoxybutenyl methacrylate, isobornyl methacrylate, hydroxyethyl (meth)acrylate, hydroxypropyl(meth)acrylate, hydroxylbutyl (meth)acrylate, acetoacetoxy ethyl methacrylate, acetoacetoxy ethyl acrylate, acrylonitrile, vinyl chloride, vinylidene chloride, vinyl acetate, vinyl ethylene carbonate, epoxy butene, 3,4-dihydroxybutene, hydroxyethyl (meth)acrylate, methacrylamide, acrylamide, butyl acrylamide, ethyl acrylamide, diacetoneacrylamide, butadiene, vinyl ester monomers, vinyl(meth)acrylates, isopropenyl(meth)acrylate, cycloaliphaticepoxy(meth)acrylates, ethylformamide, 4-vinyl-1,3-dioxolan-2-one, 2,2-dimethyl-4 vinyl-1,3-dioxolane, 3,4-di-acetoxy-1-butene, and monovinyl adipate t-butylaminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethyl acrylate, N-(2-methacryloyloxy-ethyl)ethylene urea, and methacrylamidoethylethylene urea. Additional suitable ethylenically unsaturated monomers are described in *The Brandon Associates,* 2nd edition, 1992 Merrimack, N.H., and in Polymers and Monomers, the 1966-1997 Catalog from Polyscience, Inc., Warrington, Pa., U.S.A.

In one embodiment, the fluoropolymer is a copolymer of α,β,β-trifluorostyrene with one or more ethylenically unsaturated monomers selected from the group consisting of styrene, methyl acrylate, methyl methacrylate, butyl acrylate, butyl methacrylate, 2-ethylhexyl acrylate, acrylic acid, methacrylic acid, α-methyl styrene, 4-methylstyrene, vinyl biphenyl, acrylonitrile, and isoprene.

Polymerization may be carried out by a method known in the art such as bulk, solution, emulsion, or suspension polymerization. The reaction may be free radical, cationic, anionic, zwitterionic, Ziegler-Natta, or atom transfer radical type of polymerization. Emulsion polymerization may be used when a copolymer with a particularly high molecular weight is desirable. A high molecular weight copolymer can lead to better film quality.

Methods for the preparation of homopolymers and copolymers of monofluoro, difluoro, and trifluorostyrene can be found in *Progress in Polymer Science,* Volume 29 (2004), pages 75-106, Elsevier Ltd., Mo., USA, the content of which is incorporated herein by reference.

Methods for the preparation of styrenic fluoropolymers have been disclosed in U.S. Pat. No. 8,871,882, the content of which is incorporated herein by reference in its entirety.

The acrylic polymer (ii) may generally be referred to as a vinyl homopolymer or copolymer of an acrylate or methacrylate monomer. Examples of such acrylate or methacrylate monomers include, but are not limited to, methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethylhexyl acrylate, isoprene, octyl acrylate, octyl methacrylate, iso-octyl acrylate, iso-octyl methacrylate, isobornyl (meth)acrylate, cyclohexyl (meth)acrylate, hydroxymethyl (meth)acrylate, hydroxyethyl (meth)acrylate, hydroxypropyl (meth)acrylate, hydroxylbutyl (meth)acrylate, acetoacetoxy ethyl methacrylate, acetoacetoxy ethyl acrylate, methyl 2-(hydroxymethyl)acrylate, ethyl 2-(hydroxymethyl)acrylate, isopropyl 2-(hydroxymethyl)acrylate, n-butyl 2-(hydroxymethyl)acrylate, and t-butyl 2-(hydroxymethyl)acrylate and the like. In one embodiment, the acrylic polymer is a homopolymer of a methacrylate or a copolymer of two or more methacrylates. In another embodiment, the acrylic polymer (ii) is one or more selected from the group including polymethyl methacrylate, polyethyl methacrylate, polyisopropyl methacylate, or combinations thereof.

Other ethylenically unsaturated monomers besides (meth)acrylate monomers may also be used to form the acrylic copolymer. Examples of such monomers include styrene, maleimide, N-alkylmaleimide, N-phenylmaleimide, N-arylmaleimide, and other N-substituted maleimide. In another embodiment, the acrylic polymer (ii) is a copolymer of two or more monomers selected from the group including methyl methacrylate, ethyl methacrylate, isopropyl methacrylate, maleimide, N-alkylmaleimide, N-phenylmaleimide, N-arylmaleimide, and N-substituted maleimide.

The acrylic polymer (ii) may be further treated before use, for example, by heating to effect the formation of a lactone ring structure (1). Such an acrylic polymer having a lactone ring structure is advantageous in mechanical strength as disclosed in US Patent Application No. 20090202822 A1, the content of which is incorporated herein by reference.

In order to produce the acrylic polymer having a lactone ring structure, an acrylic monomer having 2-hydroxymethyl substituent at the alpha position of an acrylate is required in the copolymer composition. Examples of such a monomer include methyl 2-(hydroxymethyl)acrylate, ethyl 2-(hydroxymethyl)acrylate, isopropyl 2-(hydroxymethyl)acrylate, n-butyl 2-(hydroxymethyl)acrylate, and t-butyl 2-(hydroxymethyl)acrylate.

In another embodiment, a polymer film made from a polymer blend is provided. That polymer blend may include:
i. a fluoropolymer having a moiety of wherein $R^1$, $R^2$, and $R^3$ are each independently hydrogen atoms, alkyl groups, substituted alkyl groups, or halogens, wherein at least one of $R^1$, $R^2$, and $R^3$ is a fluorine atom, wherein R is independently a substituent on the styrenic ring and n is an integer from 0 to 5 representing the number of R substituents on the styrenic ring; and
iii. an acrylic polymer.

In one embodiment, the polymer film of the invention has a light transmittance greater than 85%, greater than 90%, or greater than 95% throughout the wavelength range of from 400 nm to 800 nm, as measured by a UV-Visible spectrophotometer.

The polymer film can be prepared by solution cast of the polymer blend in a solvent or hot-melt extrusion. The casting of a polymer solution onto a substrate may be carried out by a method known in the art such as, for example, spin coating, spray coating, roll coating, curtain coating, or dip coating. Melt extrusion can be carried out by mixing the polymers in a powder form before extrusion or by co-extrusion of the solid polymer components.

Suitable solvents for making the polymer blend include, but are not limited to toluene, methyl isobutyl ketone, cyclopentanone, methylene chloride, chloroform, 1,2-dichloroethane, methyl amyl ketone, methyl ethyl ketone, methyl isopropyl ketone, methyl isoamyl ketone, ethyl acetate, n-butyl acetate, propylene glycol methyl ether acetate, and a mixture thereof.

Methods for casting polymer films from solutions containing styrenic fluoropolymer have been disclosed in U.S. Pat. No. 8,889,043, the content of which is incorporated herein by reference in its entirety.

Polymer blend solutions may further contain other ingredients such as other polymers or additives. Plasticizers may be used for film formation to improve film properties. Examples of suitable plasticizers include those available from Eastman Chemical Company: Abitol E (hydrogenated gum rosin), Permalyn 3100 (tall oil rosin ester of pentaerythritol), Permalyn 2085 (tall oil rosin ester of glycerol), Permalyn 6110 (gum rosin ester of pentaerythritol), Foralyn 110 (hydrogenated gum rosin ester of pentaerythritol), Admex 523 (a dibasic acid glycol polyester), and Optifilm Enhancer 400 (a proprietary low VOC, low odor coalescent); those available from Unitex Chemical Corp.: Uniplex 552 (pentaerythritol tetrabenzoate), Uniplex 280 (sucrose benzoate), and Uniplex 809 (PEG di-2-ethylhexoate); triphenylphosphate, tri(ethylene glycol) bis(2-ethylhexanoate), tri(ethylene glycol) bis(n-octanoate), and a mixture thereof.

The solution cast polymer film may have an out-of-plane birefringence (or birefringence in the film thickness direction, $\Delta n_{th}$) in the range from about 0.001 to about 0.02 throughout the wavelength range of about 400 nm to about 800 nm. The capability of having $\Delta n_{th}$ in the polarizer protective film is advantageous in that it can also function as a retardation compensation film to improve the image of a display.

Birefringence ($\Delta n$) of a wave plate may be measured by determining the birefringence of a wave plate over a wavelength range of about 400 nm to about 800 nm at different increments. Alternatively, birefringence may be measured at a specific light wavelength.

The polymer film can be stretched by a method known in the art to increase the mechanical strength or to obtain the desirable optical properties, such as specific in-plane retardation (Re) or out-of-plane retardation (Rth). Suitable methods for stretching include uniaxial and biaxial stretching. The polymer film of this invention is especially suitable for stretching as compared to acrylic films, which are typically too brittle to be stretched adequately.

The polymer film may generally exhibit high heat resistance, excellent mechanical strength, and high transparency; thus, it can be used as a protective film for a polarizer in an optical device. Known polarizers may typically be based on polyvinyl alcohol (PVA), which can be easily affected by heat and moisture. Protective films are needed to sandwich the PVA film in order to preserve its optical properties. Cellulose ester films have typically been used as the protective films for the polarizers. However, there has been increased interest in the industry to replace the cellulose-based films with acrylic polymers due to the deficiency of the cellulose-based films in humidity resistance. Conventional acrylic polymers are able to provide improved humidity resistance, but they are known to be brittle and lacking mechanical strength. Moreover, the glass transition temperature (Tg) of common acrylic polymers is in the range of about 100° to 120° C., which does not provide adequate heat resistance as a protective film.

Known acrylic resins having a lactone ring structure have been shown to have high mechanical strength and be suitable for use as protective films for polarizers. Such acrylic polymers, however, need to be coated with a cellulose thin film in order to obtain satisfactory adhesion to the polarizer film, presumably due to their lack of polar groups on the polymers. In contrast, the disclosed acrylic polymer modified with the styrenic fluoropolymer increases the film's mechanical strength and heat resistance, making itunnecessary to use an acrylic polymer having a lactone ring structure. As a result, the adhesion deficiency exhibited by the acrylic polymer having a lactone ring structure is mitigated.

In yet another embodiment, a polarizing plate is provided. The polarizing plate includes:
(a) a polarizer; and
(b) a polarizer protective film made from a polymer blend that includes:
i. a fluoropolymer having a moiety of:

wherein $R^1$, $R^2$, and $R^3$ are each independently hydrogen atoms, alkyl groups, substituted alkyl groups, or halogens, wherein at least one of $R^1$, $R^2$, and $R^3$ is a fluorine atom, wherein R is independently a substituent on the styrenic ring and n is an integer from 0 to 5 representing the number of R substituents on the styrenic ring; and
ii. an acrylic polymer.

The polarizer protective film (b) may be disposed on one side or both sides of the polarizer (a). It may be laminated directly to the polarizer (a) by using an adhesive, or there may be another layer (film or coating) in between the polarizer protective film (b) and the polarizer (a) in order to create the polarizing plate.

In one embodiment, the thickness of the polarizer protective film (b) may be from 5 to 150 μm. In another embodiment, it may be from 10 to 80 μm thick.

The polarizing plate may be suitable for use in a display device, such as a liquid crystal display device, an OLED display, or in 3D glasses. These display devices may be used for televisions, computers, cell phones, cameras, and the like.

Retardation (R) of a polymer film (or wave plate) is defined as $R=\Delta n \times d$, wherein $\Delta n$ is the birefringence and d is the thickness of the wave plate. Birefringence is classified into in-plane birefringence $\Delta n = n_x - n_y$, and out-of-plane birefringence $\Delta n = n_z - (n_x + n_y)/2$, wherein $n_x$ and $n_y$ represent in-plane refractive indices and $n_z$ the thickness-direction refractive index. Thus, in-plane retardation is represented by $R_e = (n_x - n_y) \times d$, and out-of-plane retardation, $R_{th} = [n_z - (n_x + n_y)/2] \times d$.

Generally, the crossed polarizers used in a display device, such as liquid crystal display (LCD), require a wave plate to compensate for the phase changes of the off-angle lights.

Polymer films having positive out-of-plane birefringence can be used for such a purpose; such optical films having positive out-of-plane birefringence are commonly referred to as positive C-plate having a refractive index profile of $n_x=n_y<n_z$. One way to compensate for the crossed polarizers is to use a positive C-plate in combination with a positive A-plate having a refractive index profile of $n_x>n_y=n_z$.

Thus, in another embodiment, a display device may include:
(a) a polarizer,
(b) a polarizer protective film made from a polymer blend including:
  i. a fluoropolymer having a moiety of wherein $R^1$, $R^2$, and $R^3$ are each independently hydrogen atoms, alkyl groups, substituted alkyl groups, or halogens, wherein at least one of $R^1$, $R^2$, and $R^3$ is a fluorine atom, wherein R is independently a substituent on the styrenic ring and n is an integer from 0 to 5 representing the number of R substituents on the styrenic ring; and
  ii. an acrylic polymer, and
(c) a positive A-plate having a refractive index profile of $n_x>n_y=n_z$, wherein $n_x$ and $n_y$ represent in-plane refractive indices and $n_z$ the thickness-direction refractive index.

In one aspect, the polarizer protective film (b) has an out-of-plane retardation ($R_{th}$) in the range from about 30 nm to about 250 nm or from about 40 nm to about 120 nm throughout the wavelength range of about 400 nm to about 800 nm and the film thickness from 5 to 100 p.m. In another embodiment, the display device is an IPS (in-plane switching) mode LCD.

In addition to the embodiments having been disclosed, the polymer film may have other usages in various optical devices. Further embodiments include a stretched polymer film having a refractive index profile of $n_x<n_y<n_z$, which is commonly referred to as biaxial film. Such stretched polymer film can provide in-plane birefringence as well as out-of-plane birefringence. The out-of-plane birefringence after stretching is typically higher than that of the unstretched film; thus, it can achieve the desired retardation value with a thin film, which is an advantage in an optical device.

In a further embodiment, there is provided a stretched polymer film that is a negative A-plate having a refractive index profile of $n_x<n_y=n_z$. This can be achieved by using a suitable stretching method, such as, for example, uniaxial or biaxial stretching. A negative A-plate can be used in combination with a negative C-plate having a refractive index profile of $n_x=n_y>n_z$ to compensate for the phase changes of the crossed polarizers caused by the off-angle light. Further, the negative A-plate can have reversed dispersion characteristics in in-plane birefringence, which is advantageous in achieving desirable compensation in all visible light wavelengths. The reversed dispersion is defined as the in-plane retardation ($R_e$) satisfies the equations of $R_{e450}/R_{e550}<1$ and $R_{e650}/R_{e550}>1$, wherein $R_{e450}$, $R_{e550}$, and $R_{e650}$ are $R_e$'s at the wavelengths of 450 nm, 550 nm, and 650 nm respectively. Said reversed dispersion characteristics can be obtained by the introduction of an additive, such as a small molecule or a polymer, to the polymer film of the invention before stretching. Desirably, the additive has a rigid rod-like moiety that is capable of being aligned in the plane of the film upon stretching. The chemical structure of the rigid rod-like moiety is not particularly limited. An example of such a molecule is shown below:

In another embodiment, there is provided an NRZ film having a refractive index profile of $n_x<n_z<n_y$ or $n_x>n_z>n_y$. The NRZ film satisfies the relation of $0<N_z<1$, wherein $N_z=(n_x-n_z)/(n_x-n_y)$ or $N_z=(R_{th}/R_e)+0.5$. Such an NRZ film may have an in-plane birefringence value especially suitable for compensation of crossed polarizers; it also has a low or zero out-of-plane birefringence, which is advantageous for the purpose of compensating crossed polarizers.

In yet another embodiment, there is provided an isotropic film having a refractive index profile of $n_x=n_y=n_z$. Various methods, such as heat treatment and incorporating an additive, may be used to eliminate the birefringence existing in the polymer film to obtain an isotropic film. The isotropic film is useful when birefringence is not desirable for the purpose of the applications.

EXAMPLES

Example 1

Preparation of Polymer Blends of PTFS and PMMA at Various Ratios

Poly($\alpha,\beta,\beta$-trifluorostyrene) (PTFS) was prepared by emulsion polymerization of $\alpha,\beta,\beta$-trifluorostyrene in the presence of sodium dodecyl sulfate and dodecylamine hydrochloride, in accordance with the method disclosed in U.S. Pat. No. 8,871,882. The glass transition temperature of the PTFS polymer was 208° C., as measured by differential scanning calorimetry (DSC). Intrinsic viscosity (IV) of the PTFS polymer was 1.16 dL/g, measured by a Cannon auto capillary viscometer using cyclopentanone as the solvent at 30° C. Unless it is otherwise specified, the PTFS polymer used throughout the Example section had an IV of about 1.16 dL/g.

Poly(methyl methacrylate) (PMMA) was prepared by emulsion polymerization in accordance with a common method known in the art. The PMMA had Tg 125° C. and IV 2.99 dl/g.

Polymer blends were prepared by combining the PTFS polymer and PMMA at various ratios. A 10 wt % solution of the PTFS polymer was prepared by mixing PTFS powder in cyclopentanone; separately a 6 wt % solution was prepared by mixing PMMA solid in cyclopentanone. The polymer blends were then prepared by mixing the PTFS polymer solutions and the PMMA solution at ratios of PMMA/PTFS=0/100, 20/80, 40/60, 60/40, 80/20, and 100/0% based on the total weights of PMMA and PTFS solids. The resulting solutions were homogeneous and clear.

Example 2

Preparation of PTFS/PMMA Polymer Films by Solution Cast and their Properties

The solutions of the polymer blends prepared in Example 1 were applied to a flat glass substrate using the blade casting method. The coating films were allowed to dry in air overnight and subsequently placed in a vacuum oven at room temperature for 8 hours. After drying, the films were peeled off. Birefringence and thickness of the free standing films were measured by a Metricon Model 2010/M Prism Coupler using single film mode at a wavelength of 633 nm. The transmittance (% T) was measured by a UV-Visible spectrophotometer. The properties of the polymer films prepared are shown below in Table 1, in which d is the thickness of the film, n is the refractive index, and Δn is out-of-plane birefringence.

TABLE 1

Polymer Films Prepared and Their Properties

| Film ID | Type | PMMA/PTFS ratio by weight | d (μm) | n | Δn | T % 400 nm | T % 550 nm |
|---|---|---|---|---|---|---|---|
| 1 | homo-polymer | 0/100 | 20 | 1.518 | 0.0182 | 89.5% | 91.5% |
| 2 | blend | 20/80 | 18 | 1.513 | 0.0139 | 89.9% | 91.1% |
| 3 | blend | 40/60 | 17 | 1.507 | 0.0099 | 90.0% | 91.0% |
| 4 | blend | 60/40 | 19 | 1.501 | 0.0061 | 89.2% | 90.5% |
| 5 | blend | 80/20 | 18 | 1.495 | 0.0032 | 89.5% | 90.6% |
| 6 | homo-polymer | 100/0 | 20 | 1.489 | 0.0005 | 90.4% | 91.3% |

Figure 1:
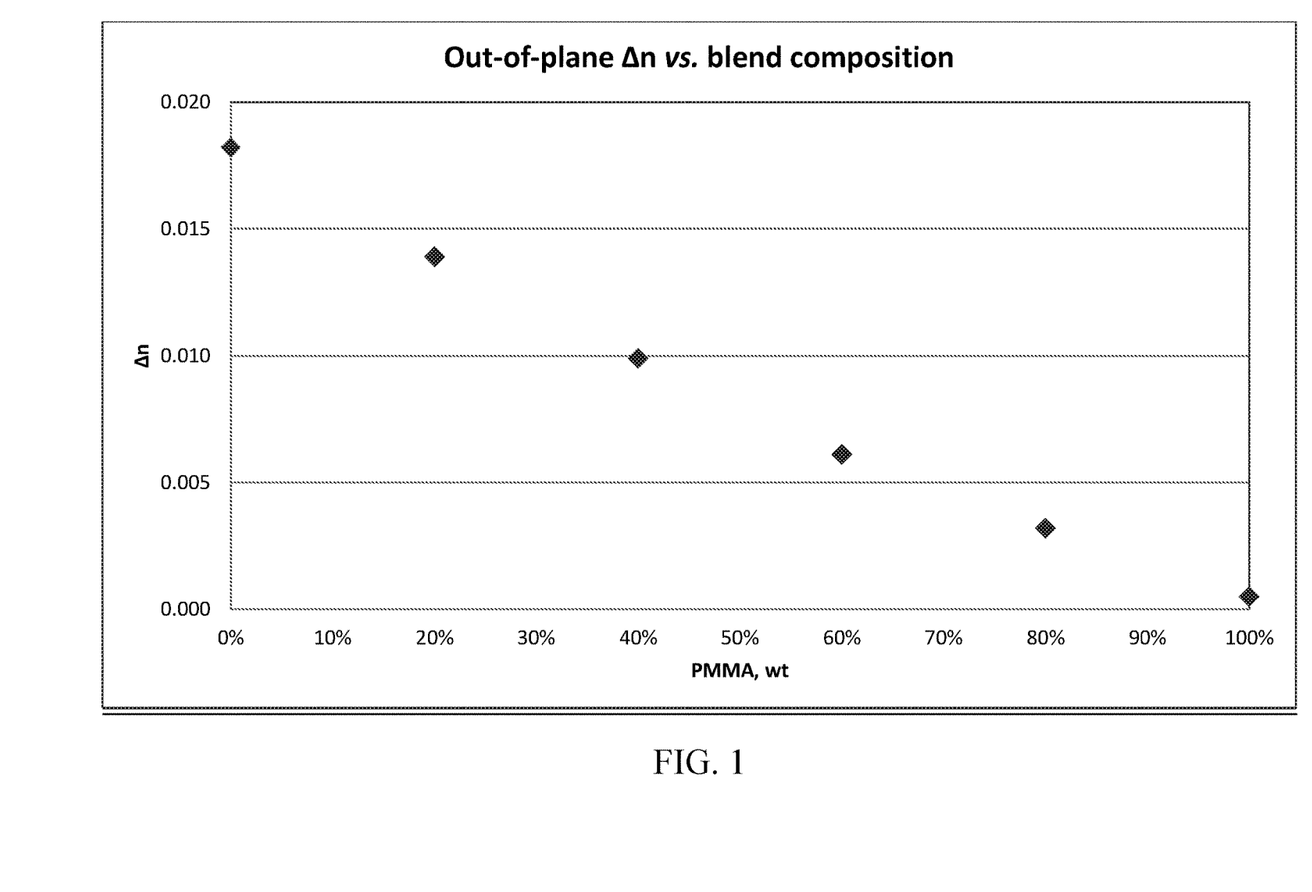
FIG. 1 is a graphical representation of the relationship of out-of-plane birefrincence of Film IDs 1-6 to the weight percent of PMMA in the polymer blend.

As shown in Table 1, high transmittances were obtained from the Film IDs 2 to 5, indicating high film clarity and good compatibility of the polymer blends. The relationship of the out-of-plane birefringence of the resulting polymer films vs. the weight percent of PMMA in the polymer blend composition is shown in FIG. 1. As the acrylic polymer content is increased, the birefringence is decreased proportionally.

Example 3

Stretching of Polymer Films

A strip of the polymer film prepared from the blend of PMMA/PTFS (80/20) was mounted on an Instron® Universal Materials Testing Machine equipped with an environmental chamber. The film was then uniaxially stretched at 110° C. to various extension ratios with a drawing speed of 50 mm/min. The refractive indices, $n_x$, $n_y$, and $n_z$, of the stretched films at various extension ratios were measured by using a prism coupler (Model 2010) from Metricon Corp. at 633 wherein $n_x$ is the in-plane refractive index parallel to the film stretching direction, $n_y$ is the in-plane refractive index perpendicular to $n_x$, and $n_z$ is the thickness refractive index. Separately, in a control experiment, PMMA films (100%) were stretched respectively at various temperatures ranging from 70° to 120° C. it was found that the films were either broken at low stretching ratios or resulted in haze films, which had no usages for optical film application, as shown in Table 2.

TABLE 2

Optical Properties of Stretched Polymer Films

| Film ID | PMMA/PTFS, ratio by wt. | d (μm) | Stretch ratio | $n_x - n_z$ | $n_y - n_z$ | $n_x - n_y$ (in-plane birefringence) | $n_z - (n_x + n_y)/2$ (out-of-plane birefringence) |
|---|---|---|---|---|---|---|---|
| 7 | 80/20 | 30 | 0 | −0.0032 | −0.0032 | 0.0000 | 0.0032 |
| 8 | 80/20 | 30 | 10% | −0.0043 | −0.0025 | −0.0018 | 0.0034 |
| 9 | 80/20 | 30 | 20% | −0.0064 | −0.0020 | −0.0044 | 0.0042 |
| 10 | 80/20 | 30 | 30% | −0.0062 | −0.0017 | −0.0045 | 0.0040 |

Comparative Example 1

Preparation of Polymer Blends of Fluoropolymer with Control Polymers

As listed in Table 3, three polymer blends (11-13) were prepared by mixing a PTFS solution in N,N-dimethylacetamide (DMAc) with either a polyimide solution in DMAc or a polyamide solution in DMAc respectively. The polyimide used was a proprietary polymer for optical film application, and the polyamide used was a condensation polymer of terephthalic acid chloride, isophthalic acid chloride, and 2,2'-bis(trifluoromethyl)benzidine. As evidenced by the low transmittance values, polymer films prepared from the three polymer blends were hazy and useless as optical films.

Additionally, polymer films 14, 15, and 16 were prepared by mixing a PTFS solution in cyclopentanone (CPN) with a polystyrene (PS) solution in CPN at varied ratios, followed by solution casting. Polymer film (17) was prepared by mixing a PTFS solution in cyclopentanone (CPN) with a cellulose acetate butyrate (CAB-381-0.5 available from Eastman Chemical Co.) solution in CPN, followed by solution casting. Polymer films 18 and 19 were prepared by mixing respectively a PTFS solution in N,N-dimethylacetamide (DMAc) with a polyacrynitrile (PAN) solution in DMAc and a polyvinyldifluoride (PVDF) solution in DMAc, followed by solution casting. As evidenced by the low transmittance values, polymer films thus prepared were hazy and useless as optical films.

TABLE 3

Control Polymer Films and Their Properties

| Film ID | PTFS % by wt. | Control polymer Polymer | % by wt. | d (μm) | T % 400 nm | T % 550 nm |
|---|---|---|---|---|---|---|
| 11 | 80 | polyimide | 20 | 22 | 40.1% | 61.4% |
| 12 | 90 | polyamide | 10 | 22 | 16.7% | 59.5% |
| 13 | 10 | polyamide | 20 | 22 | 4.4% | 25.9% |
| 14 | 20 | PS | 80 | 20 | 24.6% | 30.7% |
| 15 | 50 | PS | 50 | 20 | 14.0% | 20.9% |
| 16 | 80 | PS | 20 | 20 | 31.2% | 44.7% |
| 17 | 50 | CAB-381-0.5 | 50 | 20 | 17.6% | 47.8% |
| 18 | 50 | PAN | 50 | 20 | 37.4% | 44.5% |
| 19 | 50 | PVDF | 50 | 20 | 2.7% | 3.0% |

Example 4

Preparation of Polymer Blends of Fluoropolymer with Various Acrylic Polymers This example shows acrylic polymers that are more desirable for blending with the fluoropolymer as they formed clear solution, single Tg, and high transmittance. Table 4 is a list of acrylic polymers used for blending. Each acrylic polymer was blended with PTFS at 50/50 weight % ratio. Table 5 shows the solution and the cast film properties from the blends thus prepared, in which the one based on poly(ethyl methacrylate) has the best compatibility forming clear solution, clear film, high transmittances, and single $T_g$.

TABLE 4

List of Acrylic Polymers Used for Blending with Fluoropolymer

| Acrylic Polymer | MW | $T_g$ |
|---|---|---|
| Poly(n-butyl methacrylate) | 337k | 15 |
| Poly(ethyl methacrylate) | 515k | 63 |
| Poly(benzyl methacrylate) | 100k | 54 |
| Poly(isobutyl methacrylate) | 300k | 65 |
| Poly(n-propyl methacrylate) | 150k | 35 |
| Poly(isopropyl methacrylate) | 100k | 81 |
| Poly(cyclohexyl methacrylate) | 65k | 104 |
| Poly(methyl acrylate) | 40k | 8 |

TABLE 5

Properties of Polymer Films Prepared from Blends of Fluoropolymer with Various Acrylic Polymers at 50/50 Weight Ratio

| Film ID | Acrylate | Solution | Film | T % 400 nm | T % 550 nm | $T_g1$ (DSC) | $T_g2$ (DSC) |
|---|---|---|---|---|---|---|---|
| 20 | Poly(n-butyl methacrylate) | hazy | hazy | 46.8% | 61.2% | 33.9 | 206.5 |
| 21 | Poly(ethyl methacrylate) | clear | clear | 90.6% | 92.0% | 124.5 | n/a |
| 22 | Poly(benzyl methacrylate) | hazy | hazy | 30.5% | 37.8% | 60.8 | 205.4 |
| 23 | Poly(isobutyl methacrylate) | hazy | hazy | 39.0% | 57.2% | 68.5 | 196.8 |
| 24 | Poly(n-propyl methacrylate) | hazy | hazy | 27.4% | 32.4% | 47.9 | 208.0 |
| 25 | Poly(isopropyl methacrylate) | hazy | hazy | 74.7% | 80.1% | 89.7 | 196.8 |

TABLE 5-continued

Properties of Polymer Films Prepared from Blends of Fluoropolymer with Various Acrylic Polymers at 50/50 Weight Ratio

| Film ID | Acrylate | Solution | Film | T % 400 nm | T % 550 nm | $T_g1$ (DSC) | $T_g2$ (DSC) |
|---|---|---|---|---|---|---|---|
| 26 | Poly(cyclohexyl methacrylate) | clear | S hazy | 52.1% | 61.9% | 100.9 | 192.8 |
| 27 | Poly(methyl acrylate) | clear | hazy | 12.7% | 22.0% | 13.3 | 204.6 |

Example 5

Preparation of Polymer Blends of Fluoropolymer with PEMA at Various Ratios

Polymer blends were prepared by mixing a PTFS in cyclopentanone (10 wt. %) solution with a poly(ethyl methacrylate) (PEMA) in cyclopentanone (10 wt. %) solution at various ratios, as listed in Table 6. All the blends formed clear solutions, clear films, high transmittances, and sigle Tg's.

TABLE 6

Polymer Blends of Fluoropolymer with PEMA at Various Ratios

| Film ID | PEMA wt. | PTFS wt. | Solution | Film | n | Δn | d (μm) | T % 400 nm | T % 550 nm | Tg (DSC) |
|---|---|---|---|---|---|---|---|---|---|---|
| 28 | 100 | 0 | clear | clear | 1.4830 | 0.0001 | 31 | 91.6% | 92.2% | 67.3 |
| 29 | 90 | 10 | clear | clear | 1.4875 | 0.0007 | 30 | 89.5% | 90.5% | 73.1 |
| 30 | 80 | 20 | clear | clear | 1.4908 | 0.0016 | 32 | 90.8% | 91.5% | 84.2 |
| 31 | 60 | 40 | clear | clear | 1.4986 | 0.0039 | 31 | 91.2% | 91.8% | 109.6 |
| 32 | 50 | 50 | clear | clear | 1.5025 | 0.0058 | 32 | 90.6% | 92.0% | 124.5 |
| 33 | 40 | 60 | clear | clear | 1.5053 | 0.0068 | 31 | 90.7% | 91.9% | 138.8 |
| 34 | 21 | 79 | clear | clear | 1.5118 | 0.0101 | 32 | 90.0% | 90.5% | 161.3 |

Example 6

Preparation of Polymer Blends of PTFS (with Different IV) with PiPMA and PBMA Polymer blends were prepared by mixing PTFS (with different intrinsic viscosity (IV) as listed in table 7) in CPN, 10% wt) solutions with poly(isopropyl methacrylate) (PiPMA, with MW as listed in table 4)) and poly(n-butyl methacrylate)(PBMA, with MW as listed in table 4) solutions (CPN, 10% wt) at 50/50 wt ratio. All the blends of PTFS/PBMA formed hazy solutions and hazy films with low transmittances, indicating the incompatibility. When the PTFS has IV of 1.16 dL/g, the blend of PTFS/PiPMA formed slightly hazy solution and slightly hazy films. When the PTFS has IV of 0.80 dL/g or lower, the blends of PTFS/PiPMA formed clear solution and clear films with high transmittances, indicating good compatibility.

Table 7

Polymer Blends of PTFS with PBMA and PiPMA

| Film ID | Acrylic | PTFS IV dL/g | Wt ratio | Solution | Film | d (μm) | T % 400 nm | T % 550 nm |
|---|---|---|---|---|---|---|---|---|
| 35 | PBMA | 0.26 | 50/50 | hazy | hazy | 25 | 22.2% | 38.1% |
| 36 | PBMA | 0.51 | 50/50 | hazy | hazy | 22 | 42.1% | 59.6% |

Table 7-continued

Polymer Blends of PTFS with PBMA and PiPMA

| Film ID | Acrylic | PTFS IV dL/g | Wt ratio | Solution | Film | d (µm) | T % 400 nm | T % 550 nm |
|---|---|---|---|---|---|---|---|---|
| 37 | PBMA | 0.63 | 50/50 | hazy | hazy | 21 | 44.7% | 60.2% |
| 38 | PBMA | 0.80 | 50/50 | hazy | hazy | 19 | 49.0% | 64.4% |
| 39 | PBMA | 1.16 | 50/50 | hazy | hazy | 26 | 46.8% | 61.2% |
| 40 | PiPMA | 0.26 | 50/50 | clear | clear | 24 | 90.0% | 90.4% |
| 41 | PiPMA | 0.51 | 50/50 | clear | clear | 23 | 88.3% | 90.0% |
| 42 | PiPMA | 0.63 | 50/50 | clear | clear | 21 | 90.4% | 91.2% |
| 43 | PiPMA | 0.80 | 50/50 | clear | clear | 20 | 90.0% | 91.0% |
| 44 | PiPMA | 1.16 | 50/50 | clear | slightly hazy | 27 | 74.7% | 80.1% |

Example 7

Optical Property of Polymer Films Cast from Polymer Blends of Acrylic Polymer and Fluoropolymer Polymer films were cast respectively from the blends of PEMA/PTFS (50/50) in cyclopentanone and PiPMA(poly-isopropyl methacrylate)/PTFS (50/50) (PTFS IV=0.80 dL/g) in cyclopentanone, and their Rth's measured, as listed in Table 8.

TABLE 8

Properties of Polymer Films Prepared from Polymer Blends of Acrylic Polymer and Fluoropolymer

| Film ID | Blend | d(µm) | Re, nm | Rth, nm |
|---|---|---|---|---|
| 45 | PEMA/PTFS (50/50) | 54 | 0.190 | 249.9 |
| 46 | PEMA/PTFS (50/50) | 66 | −0.092 | 285.3 |
| 47 | PiPMA/PTFS (50/50) | 64 | 0.189 | 300.6 |

Example 8

Stretching of Polymer Films

A constrained biaxial stretching method was used for film stretching of polymer films 45-47 prepared from Example 7. The film prepared above was mounted on a stretching machine (Karo IV laboratory film stretcher available from Brückner) equipped with a heating chamber. The film was pre-heated for 25 seconds to reach the stretching temperature of about 110° C. and subsequently stretched in the machine direction (MD) at a speed of 7.0 mm/sec to a desired stretch ratio. The transverse direction (TD) was constrained. The optical properties of the stretched films were measured, as listed in Table 9.

TABLE 9

Optical Properties of Stretched Polymer Films

| Film ID | d (µm) | Re (nm) | Rth (nm) | Re (450)/ Re (550) | Re (650)/ Re (550) | Conditions |
|---|---|---|---|---|---|---|
| 48 | 41 | −19.552 | 409.190 | 1.055 | 0.974 | 1.2 × 1.2 at 110° C. |
| 49 | 64 | −233.979 | 304.912 | 1.057 | 0.969 | 1 × 1.10 at 110° C. |
| 50 | 64 | −244.7 | 639.3 | 1.058 | 0.969 | 1 × 1.11 at 110° C. |

Example 9

Synthesis of Rigid Rod-Like Molecule as Additive for Polymer Blend

Into a 500 mL three-necked round bottom flask quipped with a nitrogen inlet, a mechanical stir, a Dean Stark trap, a condenser, and a nitrogen outlet were added 4-phenylethynyl phthalic anhydride (PEPA), 49.68 gram (0.200 mol), 2,2'-bis(trifluoromethyl) benzidine (PFMB), 32.03 gram (0.100 mol), m-cresol (320 ml), and isoquinoline (0.2 ml). The reaction, as described below, was carried out in an oil bath at 180-200° C. under nitrogen for 24 hours. After cooling, the solution was poured into 1000 ml methanol to yield light yellow powder. The product was then collected, washed three times with fresh methanol and then dried in a vacuum oven at 80° C. for 16 hours. The yield of PEPA-PFMB was 97%.

Example 10

Preparation of Polymer Films with and without the Additive

Polymer films with and without the additive (PEPA-PFMB) prepared in Example 9 were cast from the blends (in the solvent, N,N'-dimethylacetamide) listed in Table 10. Films 51 and 52 do not contain the additive, while Films 53 and 54 contain 10% additive and Film 38 contains 20%.

TABLE 10

Optical Properties of Polymer Films Cast from Blends of PMMA/PTFS with and without the Additive

| Film ID | Blend Composition (weight %) | As-cast $R_e$ | As-cast $R_{th}$ | d (μm) | $R_{th}450/R_{th}550$ | $R_{th}650/R_{th}550$ |
|---|---|---|---|---|---|---|
| 51 | PMMA/PTFS | 4.20 | 107.6 | 82 | 1.054 | 0.968 |
| 52 | 80/20 | 13.5 | 104.4 | 80 | 1.053 | 0.969 |
| 53 | PMMA/PTFS/PEPA- | −0.2 | 53.1 | 70 | 1.026 | 0.981 |
| 54 | PFMB 80/20/10 | 0.5 | 49.6 | 68 | 1.029 | 0.980 |
| 55 | PMMA/PTFS/PEPA-PFMB 80/20/20 | 0.3 | 33.4 | 70 | 0.973 | 1.002 |

Example 11

Stretching of Polymer Films Prepared from Example 10

Polymer films 51-55 prepared from Example 10 were stretched according to the method described in Example 8 with or without constraint and their optical properties measured. The results are listed in Table 11.

TABLE 11

Optical Properties of Stretched Polymer Films

| Film ID | Blend Composition | Streched $R_e$ (nm) | Streched $R_{th}$ (nm) | $N_z$ ($R_{th}/R_e$) +0.5 | d, (μm) | $R_e450/R_e550$ | $R_e650/R_e550$ | Stretch Ratio | Stretch Temp (C.) | Constraint |
|---|---|---|---|---|---|---|---|---|---|---|
| 56 | PMMA/PTFS | −197.1 | 140.7 | −0.21 | 80 | 1.058 | 0.970 | 1 × 1.30 | 110 | N |
| 57 | 80/20 | −12.5 | 177.5 | −13.7 | 58 | 1.062 | 0.973 | 1.30 × 1.30 | 110 | Y |
| 58 | PMMA/PTFS/PEPA-PFMB 80/20/10 | −148.4 | 89.0 | −0.1 | 60 | 1.010 | 0.987 | 1 × 1.50 | 110 | N |
| 59 |  | −92.7 | 44.8 | 0.02 | 70 | 1.015 | 0.986 | 1 × 1.30 | 130 | Y |
| 60 | PMMA/PTFS/PEPA-PFMB 80/20/20) | −71.1 | 48.5 | −0.18 | 64 | 0.922 | 1.017 | 1 × 1.40 | 110 | N |

Example 12

Preparation of Polymer Films with and without the Additive

Polymer films were cast from polymer blends (in the solvent, N,N'-dimethylacetamide) of PEMA and PTFS with various levels of PEPA-PFMB additive, as shown in Table 12.

TABLE 12

Optical Properties of Cast Films of Polymer Blends of PEMA and PTFS with Various Levels of PFMB Additive

| Film ID | PEMA/PTFS/PEPA-PFMB (wt) | d(μm) | n | Δn |
|---|---|---|---|---|
| 61 | 80/20/0 | 30 | 1.4908 | 0.0016 |
| 62 | 80/20/15 | 30 | 1.5123 | 0.0007 |
| 63 | 80/20/20 | 30 | 1.5170 | 0.0005 |
| 64 | 80/20/25 | 30 | 1.5228 | 0.0002 |
| 65 | 90/10/15 | 30 | 1.5076 | 0.0002 |
| 66 | 90/10/20 | 30 | 1.5135 | 0.0002 |
| 67 | 90/10/25 | 30 | 1.5193 | 0.0000 |
| 68 | 85/15/25 | 30 | 1.5211 | 0.0002 |

Example 13

Figure 2:
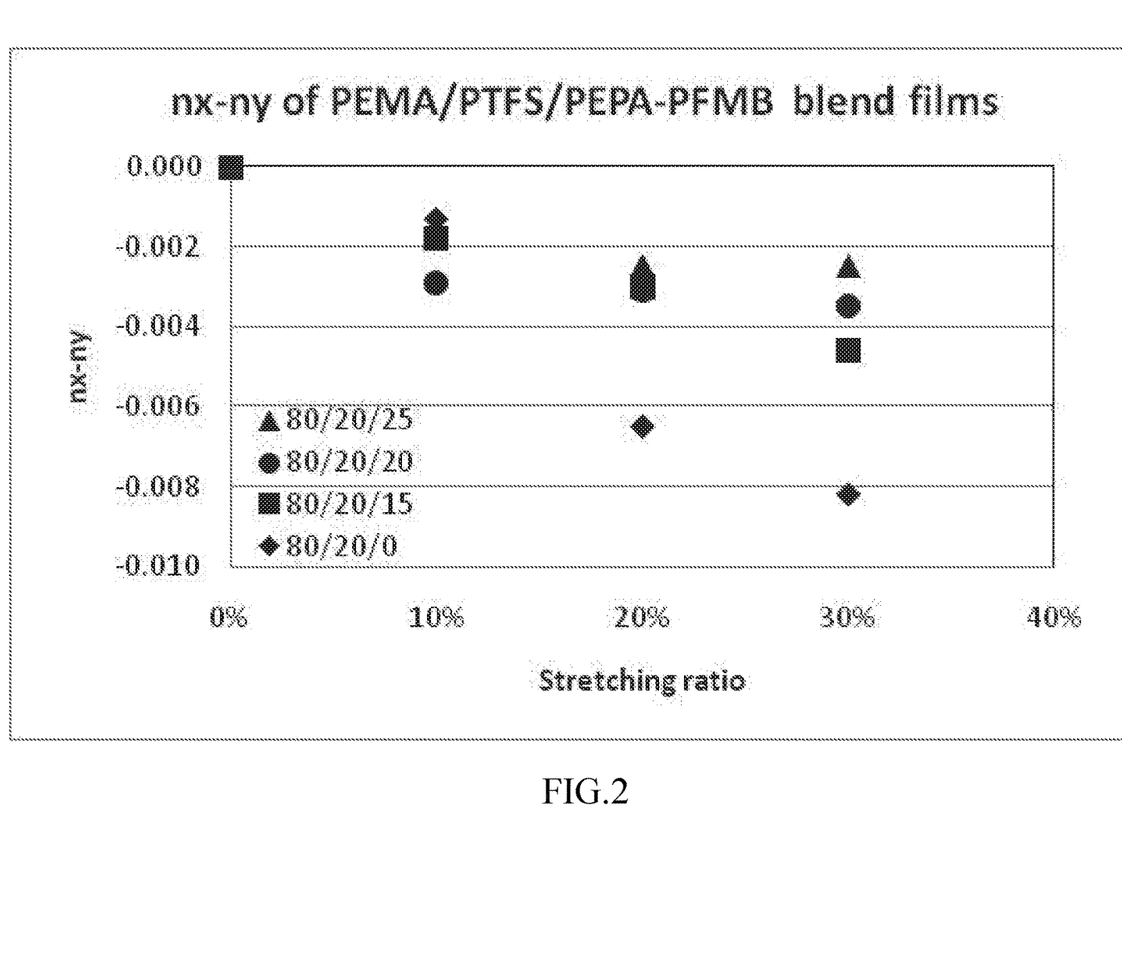
FIG. 2 is a graphical representation of in-plane birefringence of stretched polymer films 61-64 according to their stretching ratio.
Figure 3:
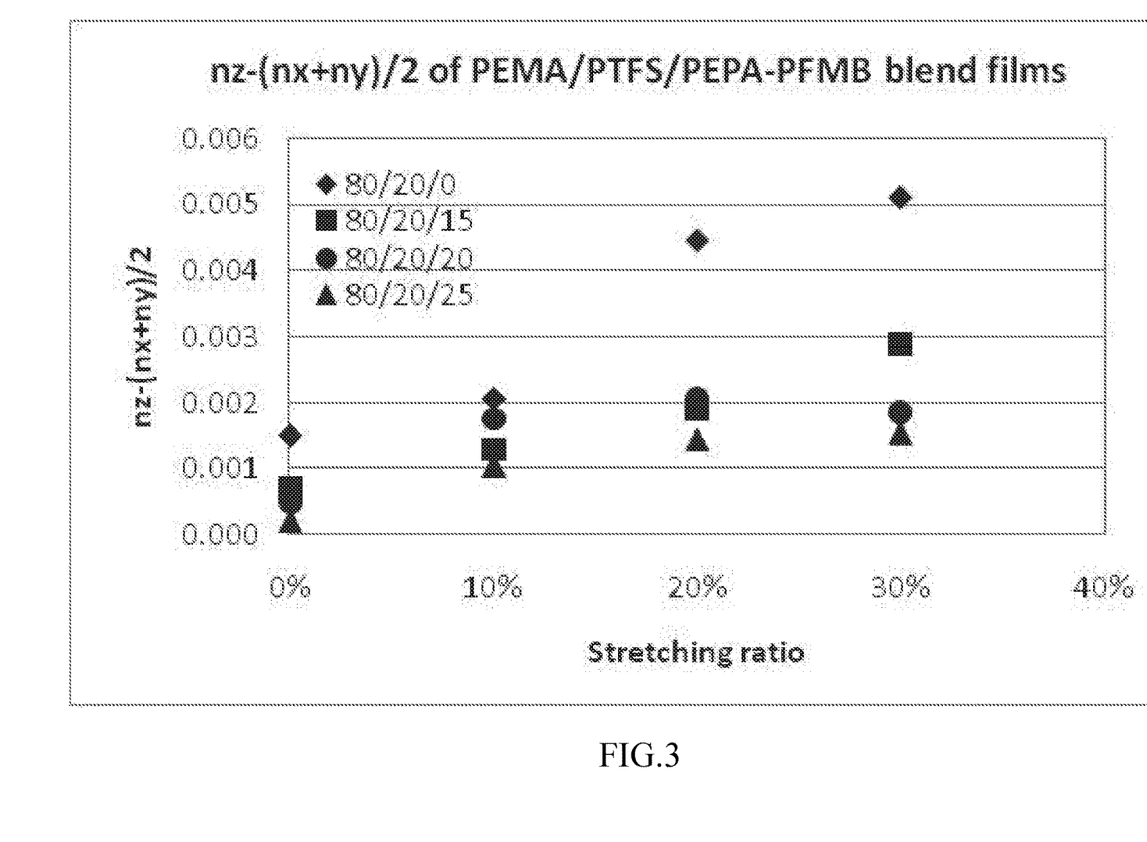
FIG. 3 is a graphical representation of out-of-plane birefringence of stretched polymer films 61-64 according to their stretching ratio.

Stretching of Polymer Film Cast from Blends of PEMA/PTFS/PEPA-PFMB with Various Ratios Polymer films 61-64, prepared from Example 12, were stretched according to the method described in Example 3 and their optical properties measured, as plotted in FIG. 2 and FIG. 3.

Example 14

Synthesis of Copolymer of Methyl Methacrylate and N-Substituted Maleimide

The Poly(Methyl Methacrylate-co-N-Phenyl Maleimide) copolymers with were prepared by emulsion polymerization in accordance with a common method known in the art, with the polymer and film properties listed in Table 13.

TABLE 13

Copolymers of Methyl Methacrylate and N-Phenyl Maleimide and the Films

| | Copolymer Properties | | | Film Properties | |
|---|---|---|---|---|---|
| | MMA/N-PHMAI | | | | |
| Film ID | Molar ratio | IV, dL/g | Tg, °C. | n | Δn |
| 69 | 94/6 | 0.98 | 138.4 | 1.4989 | 0.0001 |
| 70 | 89/11 | 0.78 | 1 44.8 | 1.5065 | −0.0001 |

TABLE 13-continued

Copolymers of Methyl Methacrylate and
N-Phenyl Maleimide and the Films

| | Copolymer Properties | | | Film Properties | |
|---|---|---|---|---|---|
| | MMA/N-PHMAI | | | | |
| Film ID | Molar ratio | IV, dL/g | Tg, °C. | n | Δn |
| 71 | 83/17 | 0.67 | 152.6 | 1.5172 | −0.0001 |
| 72 | 74/26 | 0.56 | 170.9 | 1.5304 | 0.0002 |

Example 15

Preparation of Polymer Films from Blends of PTFS
and Copolymer of Methyl Methacrylate and
N-Phenyl Maleimide at Various Ratios Polymer films were cast from polymer blends (cyclopentanone solution) of PMMA-co-P(N-Phenyl Maleimide) and PTFS, as shown in Table 14.

TABLE 14

Optical Properties of Polymer Films Cast from Blends of PMMA-co-P(N-PhenylMaleimide) and PTFS

| Film ID | P(MMA/N-PhMAI) Composition (molar) | P(MMA/ N-PhMAI)/ PTFS (wt) | Tg, °C. | Film Optical Properties | | | |
|---|---|---|---|---|---|---|---|
| | | | | n | Δn | T % 400 nm | T % 550 nm |
| 73 | 94/6 | 80/20 | 143.3 | 1.5022 | 0.0011 | 89.4% | 90.8% |
| 74 | 94/6 | 50/50 | 168.0 | 1.5085 | 0.0071 | 85.8% | 88.6% |
| 75 | 94/6 | 20/80 | 181.3 | 1.5138 | 0.0136 | 85.7% | 89.4% |

Example 16

Preparation of Polymer Films from Blends of
Copolymer of Methyl Methacrylate and N-Phenyl
Maleimide with PTFS and the PEPA-PFMB
Additive at Various Ratios Polymer films 76-79 were cast from polymer blends of copolymer of methyl methacrylate and N-phenyl maleimide (PMMA-co-P(N-Phenyl Maleimide)) with PTFS and the PEPA-PFMB additive at various ratios and their optical properties measured as listed in Table 15.

TABLE 15

Optical Properties of Polymer Films Cast from Blends
of PMMA-co-P(N-Phenyl Maleimide), PTFS and PEPA-PFMB

| Film ID | P(MMA-NPhMAI)(94/6 molar)/ PTFS/PEPA-PFMB (wt) | d(μm) | n | Δn |
|---|---|---|---|---|
| 76 | 85/15/20 | 30 | 1.5256 | 0.0009 |
| 77 | 90/10/20 | 30 | 1.5239 | 0.0004 |
| 78 | 95/5/20 | 30 | 1.5236 | 0.0000 |
| 79 | 100/0/20 | 30 | 1.5225 | −0.0003 |

Example 17

Stretching of Polymer Films from Blends of
Copolymer of Methyl Methacrylate and
N-Substituted Maleimide with PTFS and the
PEPA-PFMB Additive at Various Ratios

Figure 4:
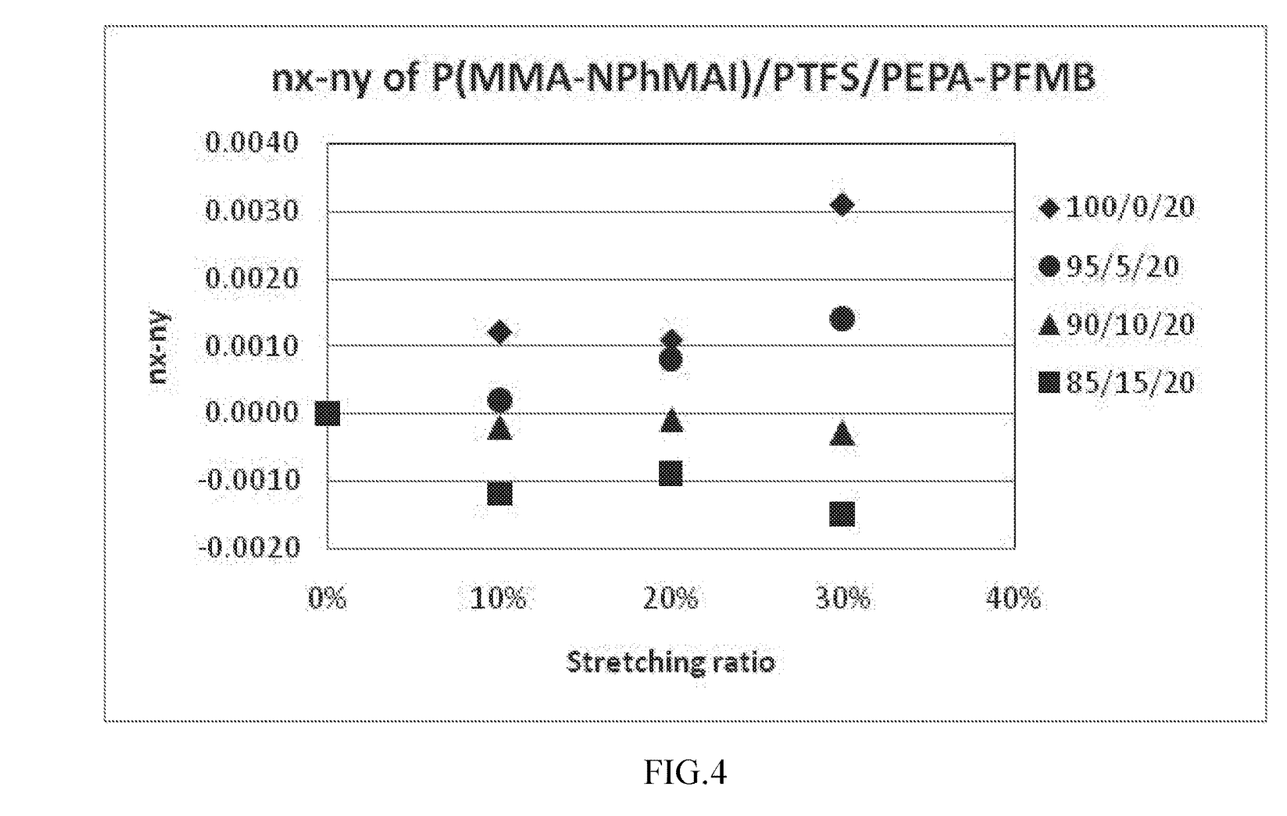
FIG. 4 is a graphical representation of in-plane birefringence of stretched polymer films 76-79 according to their stretching ratio.
Figure 5:
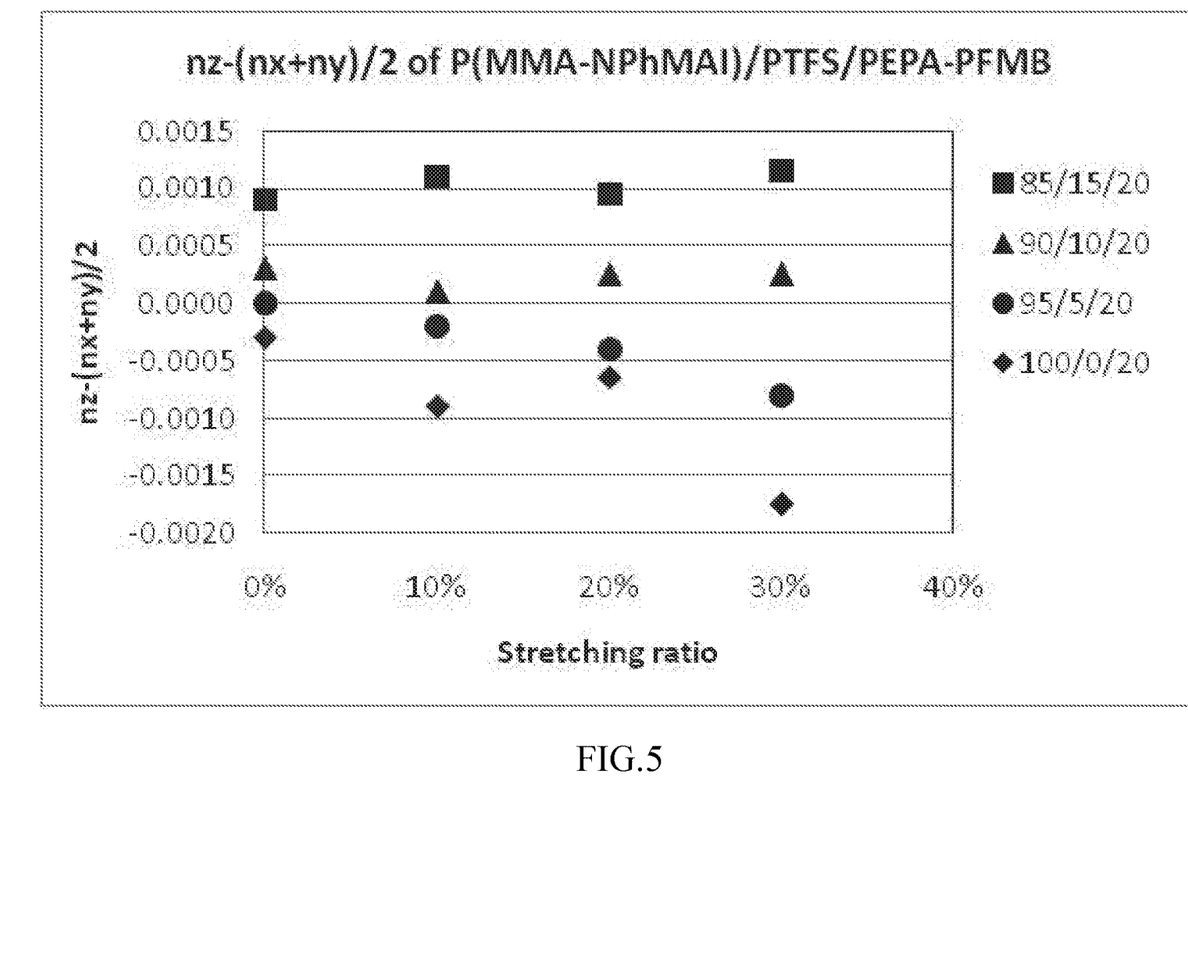
FIG. 5 is a is a graphical representation of out-of-plane birefringence of stretched polymer films 76-79 according to their stretching ratio.

Polymer films prepared from Example 16 were stretched according to the method described in Example 3 and their optical properties measured. The in-plane and out-of-plane birefringence vs. the stretching ratio were plotted in FIG. 4 and FIG. 5.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available or prudent in manufacturing. To the extent that the term "operably connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The invention claimed is:

1. A polymer blend comprising:
   i. a fluoropolymer having a moiety of:

wherein $R^1$, $R^2$, and $R^3$ are each independently hydrogen atoms, alkyl groups, substituted alkyl groups, or halogens, wherein at least one of $R^1$, $R^2$, and $R^3$ is a fluorine atom, wherein R is independently a substituent on the styrenic ring and n is an integer from 0 to 5 representing the number of R substituents on the styrenic ring; and
   ii. an acrylic polymer, wherein the acrylic polymer is:
      (a) selected from the group consisting of polymethyl methacrylate, polyethyl methacrylate, polyisopropyl methacylate, and combinations thereof, or
      (b) a copolymer of two or more monomers selected from the group consisting of methyl methacrylate, ethyl methacrylate, isopropyl methacrylate, maleimide, N-alkylmaleimide, N-phenylmaleimide, N-arylmaleimide, and N-substituted maleimide.

2. The polymer blend of claim 1, wherein the polymer blend has a single glass transition temperature.

3. The polymer blend of claim 1, wherein each substituent R on the styrenic ring is selected from the group consisting of alkyl, substituted alkyl, halogen, hydroxyl, carboxyl, nitro, alkoxy, amino, sulfonate, phosphate, acyl, acyloxy, phenyl, alkoxycarbonyl, and cyano.

4. The polymer blend of claim 1, wherein the fluoropolymer is poly($\alpha,\beta,\beta$-trifluorostyrene) (PTFS).

5. The polymer blend of claim 1, wherein the acrylic polymer selected from the group consisting of polymethyl methacrylate, polyethyl methacrylate, polyisopropyl methacylate, and combinations thereof.

6. The polymer blend of claim 1, wherein the acrylic polymer is a copolymer of two or more monomers selected from the group consisting of methyl methacrylate, ethyl methacrylate, isopropyl methacrylate, maleimide, N-alkylmaleimide, N-phenylmaleimide, N-arylmaleimide, and N-substituted maleimide.

7. The polymer blend of claim 1, wherein the weight percentage of the fluoropolymer is from about 5% to about 95% and the weight percentage of the acrylic polymer is from 5% to 95%, based on the total weight of the fluropolymer and the acrylic polymer.

8. The polymer blend of claim 1, wherein the weight percentage of the fluoropolymer is from 10% to 30% and the weight percentage of the acrylic polymer is from 70% to 90%, based on the total weight of the fluropolymer and the acrylic polymer.

9. A polymer film, which is made from the polymer blend of claim 1.

10. The polymer film of claim 9, wherein the polymer film is made by melt extrusion of the polymer blend of claim 1.

11. The polymer film of claim 9, wherein the polymer film is made by solution cast of the polymer blend of claim 1.

12. The polymer film of claim 9, wherein the polymer film has a thickness of from 10 to 80 µm.

13. The polymer film of claim 9, wherein the polymer film has light transmittance greater than 85% throughout the wavelength range of from 400 nm to 800 nm, as measured by a UV-visible spectrophotometer.

14. The polymer film of claim 9, wherein the polymer film has an out-of-plane birefringence in the range of from about 0.001 to about 0.02 throughout the wavelength range of about 400 nm to about 800 nm.

15. The polymer film of claim 9, wherein the polymer film is an isotropic film having a refractive index profile of $n_x=n_y=n_z$, wherein $n_x$ and $n_y$ represent in-plane refractive indices and $n_z$ the thickness-direction refractive index.

16. The polymer film of claim 9, wherein the polymer film is uniaxially or biaxially stretched.

17. The polymer film of claim 16, wherein the polymer film is a negative A plate having a refractive index profile of $n_x<n_y=n_z$, wherein $n_x$ and $n_y$ represent in-plane refractive indices and $n_z$ the thickness-direction refractive index.

18. The polymer film of claim 16, wherein the polymer film is a biaxial film having a refractive index profile of $n_x<n_y<n_z$.

19. The polymer film of claim 16, wherein the polymer film has characteristics of reversed wavelength dispersion satisfying the equations of $R_{e450}/R_{e550}<1$ and $R_{e650}/R_{e550}>1$, wherein $R_{e450}$, $R_{e550}$, and $R_{e650}$ are in-plane retardations at the wavelengths of 450 nm, 550 nm, and 650 nm respectively.

20. The polymer film of claim 16, wherein the polymer film has a refractive index profile satisfying the relation of $0<N_z<1$; wherein $N_z=(n_x-n_z)/(n_x-n_y)$ or $N_z=(R_{th}/R_e)+0.5$.

21. A polarizing plate comprising:
   a. a polarizer; and
   b. a polarizer protective film made from the polymer blend of claim 1.

22. The polarizing plate of claim 21, wherein the polarizer protective film is laminated directly to the polarizer with an adhesive.

23. The polarizing plate of claim 21, further comprising a layer disposed between the polarizer and the polarizer protective film.

24. A liquid crystal display comprising the polarizing plate of claim 21.

25. An OLED display comprising the polarizing plate of claim 21.

26. A 3D glasses comprising the polarizing plate of claim 21.

27. A liquid crystal display comprising:
   a. a polarizer,
   b. the polymer film of claim 9, and
   c. a positive A-plate having a refractive index profile of $n_x>n_y=n_z$, wherein $n_x$ and $n_y$ represent in-plane refractive indices and $n_z$ the thickness-direction refractive index.

28. The liquid crystal display of claim 27, wherein the polymer film of claim 9 has out-of-plane birefringence ($\Delta n_{th}$) in the range from about 0.001 to about 0.02 throughout the wavelength range of about 400 nm to about 800 nm.

29. The liquid crystal display of claim 27, wherein the polymer film of claim 9 has out-of-plane retardation ($R_{th}$) in the range from about 40 nm to 250 nm throughout the wavelength range of about 400 nm to about 800 nm and the film thickness from 5 to 100 µm.

* * * * *